United States Patent [19]

Phipps et al.

[11] 4,274,095

[45] Jun. 16, 1981

[54] RADAR VIDEO CONVERTER

[75] Inventors: Joe Phipps, Westminster; Robert E. Thurber, Silver Spring; Richard J. Prengaman, Severna Park, all of Md.

[73] Assignee: The United States of America as represented by the Secretary of the Navy, Washington, D.C.

[21] Appl. No.: 22,402

[22] Filed: Mar. 21, 1979

[51] Int. Cl.$^3$ .............................................. G02S 7/44
[52] U.S. Cl. ................................ 343/7 A; 343/5 CF; 343/5 DP
[58] Field of Search .............. 343/5 DP, 5 VQ, 5 CF, 343/7 A

[56] References Cited

U.S. PATENT DOCUMENTS

| | | | |
|---|---|---|---|
| 3,701,149 | 10/1972 | Patton et al. | 343/5 DP |
| 3,761,922 | 9/1973 | Evans | 343/5 DP |
| 3,778,822 | 12/1973 | Bauer | 343/7 A X |
| 3,778,825 | 12/1973 | Ares et al. | 343/7 A |
| 3,946,382 | 3/1976 | Kossiakoff et al. | 343/5 VQ |
| 3,995,270 | 11/1976 | Perry et al. | 343/7 A |
| 4,005,415 | 1/1977 | Kossiakoff et al. | 343/5 VQ |
| 4,031,364 | 6/1977 | Wilmot | 343/5 DP X |
| 4,044,352 | 8/1977 | Wilmot | 343/5 VQ |
| 4,062,012 | 12/1977 | Colbert et al. | 343/5 DP X |
| 4,074,264 | 2/1978 | Wilmot | 343/5 DP X |

Primary Examiner—T. H. Tubbesing
Attorney, Agent, or Firm—R. S. Sciascia; A. L. Branning

[57] ABSTRACT

The present invention relates to a two-dimensional radar video converter provided with an adaptive video processor using, in series, azimuth integration, mean level detection, and batch/batch correlation for target detection. The radar video converter also includes a computer interface module which selects from a plurality of threshold levels the signal thresholds to be exceeded in detecting targets in a particular radar environment. Together, the adaptive video processor and the computer interface module convert raw radar video into useful data which can be entered into a computer or used to display target detections at a convenient output.

8 Claims, 3 Drawing Figures

RADAR VIDEO CONVERTER

BACKGROUND OF THE INVENTION

The general concepts of radar pulse integration, mean level detection, and batch/batch correlation between successive radar returns in the detection of targets are known to the adaptive video processing field and the radar video conversion arts. In *Introduction to Radar Systems* by Skolnik (1962), Chapter 9 is devoted to such topics as correlation, integration, and the digital detection of targets. In other references, the detection, by digital techniques, of targets in the presence of varying noise and electronic countermeasure levels and the problem of maintaining a low, well-regulated false alarm rate in differing radar environments have been considered. One such system is shown in U.S. Pat. No. 4,005,415. In that system, raw video data signals are processed digitally and threshold values generated based on computer-stored information. Beam-to-beam signal correlation between scans is also provided. In essence, the reference discloses a two-dimensional (2-D) and three-dimensional (3-D) radar system which provides target detection with a constant false alarm rate, despite the presence of clutter and electro-magnetic countermeasures (ECM). A varying signal threshold which depends on the average value of input video is used to maintain a fixed false alarm rate. Thresholding is provided by an adaptive threshold and detection element which has as inputs a plurality of triads, each triad having three input video lines. Although satisfactory in its data conversion, data processing, and weapons control functions, the digital system of U.S. Pat. No. 4,005,415 does not examine problems related to 2-D radar video processors having a plurality of parallel input channels. Further, although providing a variable threshold level in order to maintain a constant false alarm rate, azimuth integration, mean level detection, and batch/batch (as opposed to beam-to-beam) correlation were not considered. U.S. Pat. No. 3,281,834 also discloses use of digital methods in a radar application wherein a multi-level unit receives analog signals and converts them to digital form, the digital output being summed in an accumulator with readings previously stored in a memory. Another digital system is disclosed in U.S. Pat. No. 3,778,828 wherein range gating is employed for doppler processing. All of the above references, while employing digital means, do not address the problems associated with multiple video inputs which are integrated over azimuth and multiplexed into a single signal and do not provide for multi-level detection using azimuth integration, mean level detection, and batch/batch correlation. Further, none of the aforementioned references disclose the multiplexing of different forms of video inputs to produce a single signal carrying different types of data which can be processed serially, thereby optimizing data rate and data storage.

A prior art reference which does provide for a plurality of digitized input video radar signals is U.S. Pat. No. 3,964,064. In that reference, a multi-level video display wherein a plurality of thresholds are employed in the same detection apparatus is disclosed. However, the plurality of variable thresholds are not provided to maintain a constant false alarm rate as in the present invention.

The prior art has suggested methods of maintaining a constant false alarm rate in differing radar environments. Likewise the use of differing types of threshold detection has also been disclosed in some references.

However, the enhanced operation resulting from the simultaneous processing of different modes of video data, channeling the data through a plurality of different detection means, and providing a plurality of selectable thresholds which can be used in maintaining a constant false alarm rate has not been addressed by the prior art, particularly in a 2-D radar application.

SUMMARY OF THE INVENTION

It is thus an object of the present invention to provide a two-dimensional (2-D) radar video converter having a plurality of video inputs, such as MTI, logarithmic, and linear.

It is also an object of the present invention to multiplex a plurality of video input signals into a single signal which can be carried on a single data line.

It is still another object of the present invention to process a single digital signal carrying video data of varying modes which have been multiplexed and to employ a plurality of serial techniques in detecting different types of targets from the multiple-mode digital signal.

In particular, it is an object of the invention to enter parallel inputs of different radar return modes into corresponding parallel memory elements which sum the responses over a plurality of azimuths, the memory elements providing output to a single output line sequentially in multiplex fashion. The multiplexed output is passed through a mean level detection stage and then through a batch/batch correlation stage which compares data in a present "batch" with data stored during an earlier "batch". The resultant effect is target detection by means of multiple detection levels.

It is finally an object of the present invention to provide a completely digital 2-D radar video converter featuring a low, regulated false alarm rate in all environments, wherein computer storage requirements are diminished. Integration dumping and video multiplexing provide for enhanced data handling. Selection of one or more signal-over-noise thresholds from a plurality of threshold levels and utilizing a plurality of detection methods provide for enhanced target detection in a variety of radar environments.

DESCRIPTION OF A PREFERRED EMBODIMENT

Video returns from radar transmissions can take many forms. If the returns carry data representing a moving target, evaluating data in a MTI (moving target indicator) mode would yield desired detection results. Stationary targets are more readily detected by radar returns in the logarithmic or linear modes. Similarly, other modes may be used to detect differing types of characteristics of targets.

Figures 1, 3:
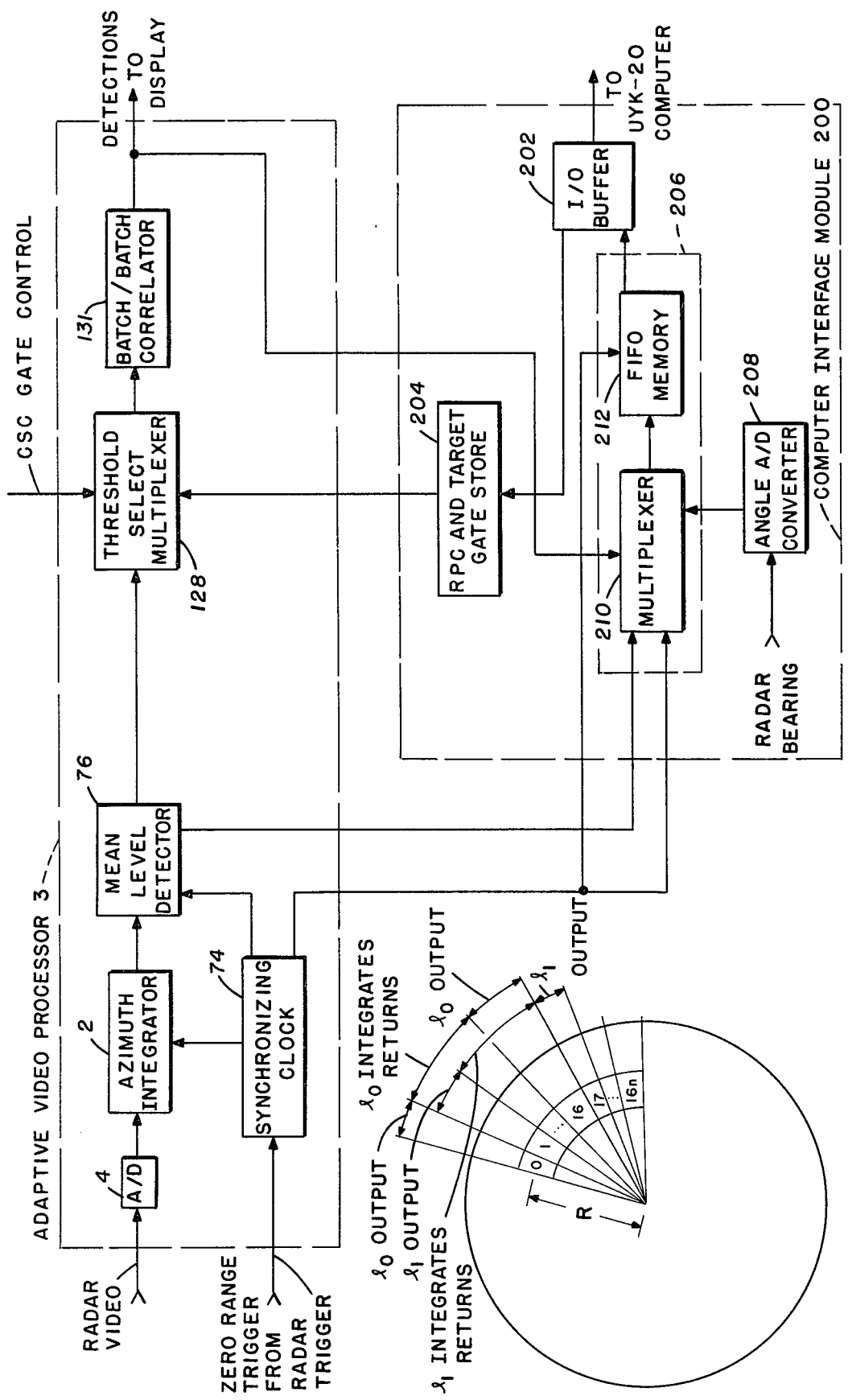
FIG. 1 is a block diagram showing the major elements and interconnections of the elements according to the present invention.
FIG. 3 is an illustration showing how the present invention integrates returns on one line while the other lines, in sequence, receive their returns.
Figure 2:
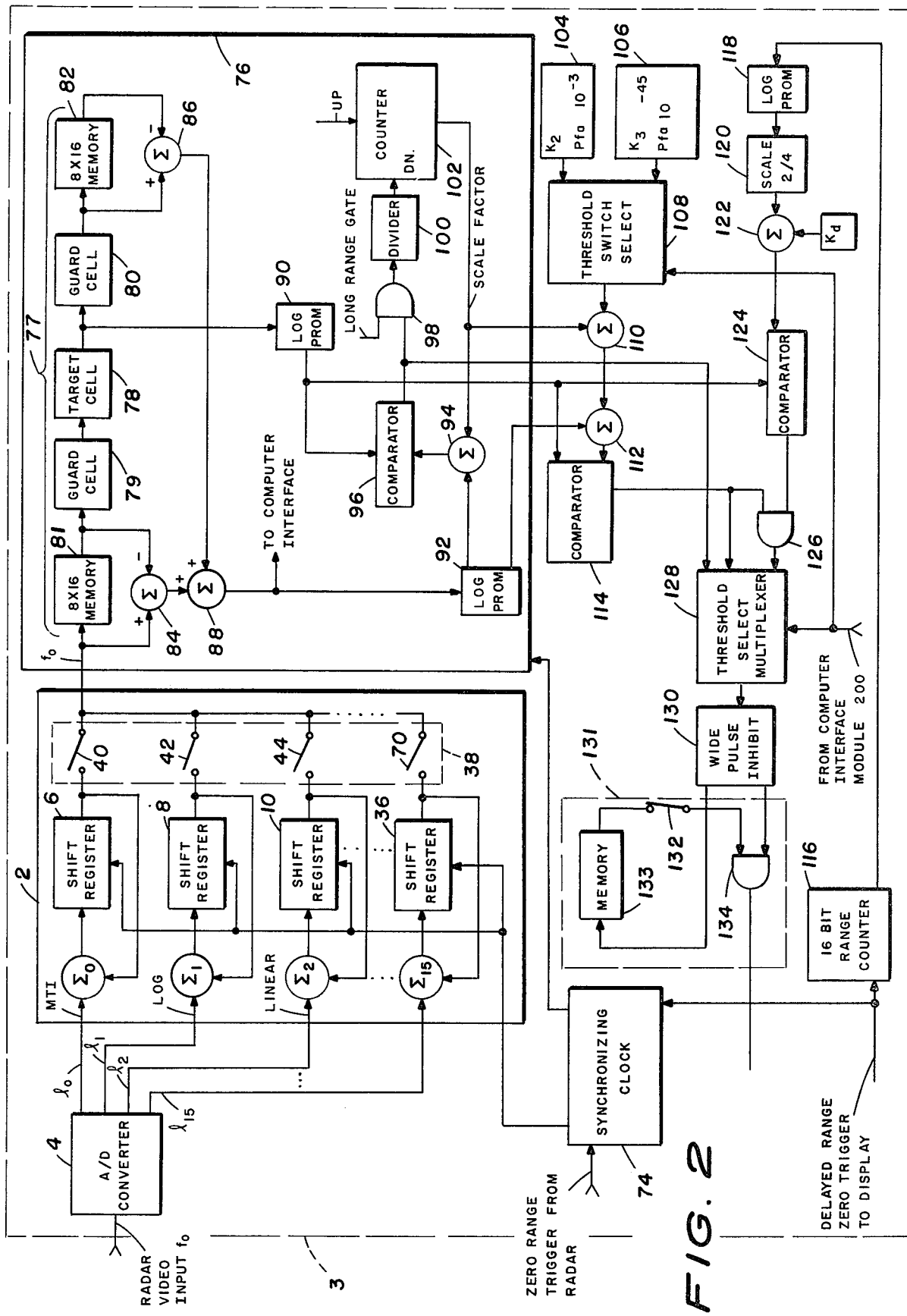
FIG. 2 is a detailed diagram of the components of the present invention, showing how the components make up the various major elements.

The present invention presupposes video inputs of various modes entering an azimuth integrator stage 2 of an adaptive video processor 3 after being digitized in an analog-to-digital (A/D) converter 4 as shown in FIG. 1 and, in greater detail, in FIG. 2. The azimuth integrator 2 in the embodiment illustrated in FIG. 2 includes sixteen digital video inputs each of which might represent a different mode of video data. Data entering on each input line is at the same rate, e.g., one MHz. For purposes of explanation, the first three channels will be discussed in detail with an understanding that the remaining channels operate in similar fashion.

Digitized video data enters the sixteen input lines $l_0$ through $l_{15}$. It is assumed, for purposes of example, that line $l_0$ carries MTI video digitized data, line $l_1$ carries logarithmic data, and line $l_2$ carries linear digitized video data. For purposes of example, input is entered at a rate of one MHz into each input line $l_0$ through $l_{15}$. The input video on each channel or line $l_0$ through $l_{15}$ is azimuth integrated, i.e., summed with previous returns on the channel over, in the present embodiment, sixteen sweeps. That is, the incoming video on each line $l_0$ through $l_{15}$ provides an input to a summer $\Sigma_0$ through $\Sigma_{15}$, the output from each summer entering a shift register 6 through 36, respectively. The output of each shift register 6 through 36 is fed back into the corresponding summer $\Sigma_0$ through $\Sigma_{15}$ as input. Each time the radar completes a sweep and increments radially to a new azimuth, an input is fed into the summers $\Sigma_0$ through $\Sigma_{15}$ to up-date the value in the corresponding shift register 6 through 36 in accumulator fashion. Associated with shift registers 6 through 36 is a multiplexer 38 having switches 40 through 70 which sequentially connects the shift registers 6 through 36 to a single output line such that each line $l_0$ through $l_{15}$ is connected to the output line once every sixteen sweeps.

Examining FIG. 3 (where the azimuth angles are, for illustration purposes, drawn considerably larger than for normal radar sweeps), the operation of the azimuth integrator 2 shown in FIG. 2 is more readily understood. As the radar sweeps from one azimuth to another, data related to a sepcific range R enters the sixteen channels $l_0$ through $l_{15}$ (of FIG. 2) simultaneously. On sweeps 0, 16, 32, . . . 16n (n=1, 2, . . . ) the output of shift register 6 (channel $l_0$) is connected to the single output line via multiplex switch 40 (of FIG. 2). Similarly on sweeps 1, 17, 33, . . . , 16n+1 (n=1, 2, 3, . . . ), shift register 8 (channel $l_1$) is connected to the output line of the azimuth integrator 2 via switch 42 of multiplexer 38. Viewing the switching as a periodic function, 50 successive shift register outputs might be considered sequentially out of phase by 22½ degree increments. The first data generated corresponds to MTI information accumulated off line $l_0$, the second serial output of data corresponding to the logarithmic information accumulated off line $l_1$, and the third would correspond to linear video accumulated off line $l_2$ and so on. Every sixteen sweeps, a synchronizing clock 74 (of FIG. 2), derived from the radar trigger, provides a reset signal to the shift registers 6 through 38. The multiplexed output from the azimuth integrator 2, in the present embodiment, is like the input, at a frequency ($f_0$) of one MHz.

It should be noted that the previous discussion, although pertaining to a single range, is, in accordance with the present invention, applicable to a plurality of range cells. That is, azimuth integration is performed in similar manner over a large number of (e.g., 4096) range cells.

Referring again to FIG. 2, the output from the azimuth integrator 2 enters a mean level detector 76. Serial data from the azimuth integrator 2 enters a shift register delay line 77 which is divided into a plurality of constituent elements. In the center of the shift register is a target cell 78 which is flanked by guard cell 79 and 80 on each side. Flanking the guard cells on the outside are two pluralities of background cells 81 and 82 used in determining the mean signal level on each side of the target cell. The mean level is obtained by adding the inputs to each plurality background cells 81 and 82 in corresponding difference element 84 and 86 which subtract from the sum of inputs to each plurality of background cells 81 and 82 the output value exiting from each plurality of background cells 81 or 82. The final value from each difference element 84 and 86 is provided to an adder 88 which combines outputs from both difference elements 84 and 86. The output of adder 88 corresponds to an 8-bit estimate of the mean level. Simultaneously, an 8-bit value of the target signal is also taken from the target cell. The 8-bit target value and the 8-bit mean level estimate enter log PROM elements 90 and 92 (see FIG. 2). The logarithm of the 8-bit mean estimate is scaled (via summer element 94) by a factor related to the desired probability of false alarm. The scaled value in logarithmic form emanating from summer element 94 is referred to as the background threshold and is compared to the target digital value (in logarithmic form) in comparator 96 to indicate target detections. In order to overcome false alarm rate problems related to short range clutter and noise, a long range gate 98 is provided which eliminates such close-in clutter and noise. The long range gate 98 has an input which is delayed with respect to a zero range trigger (from the radar) by a time corresponding to a desired "long range." The synchronizing clock 74 provides the necessary timing signal to turn on the gate 98 at the proper time. The output from this gate 98 passes through a divider 100 the dividing value of which depends on the false alarm rate desired, the long range gate width, and the number of bits and the pulse repetition frequency of a counter 102 into which the divider output enters. Counter 102 is an up-down counter incrementing at a preset rate in time relation with the radar trigger and is decremented by the output from the divider stage 100. The output from the up-down counter 102 is an 8-bit logarithmic scaling factor which is added to the 8-bit mean estimate in logarithmic form in summer 94 thereby acting as a multiplying factor for the mean estimate emanating from adder 88. It can be seen that in FIG. 2 a threshold adjustment closed loop is provided which is comprised of the summer ($\Sigma$) 94, the comparator 96, the gate 98, the divider 100, and the counter 102. In other words, the loop scales the mean level estimate (in the summer 94) to generate the background threshold against which the target cell signal is compared (in the comparator 96). When the target cell signal exceeds the background threshold, a signal suggesting the presence of a target is generated. Such signals (which are beyond a preset, minimal range) are used to generate the scale factor by means of the counter 102. The scale factor adjusts the value of the mean level estimate entering the summer ($\Sigma$) 94. When the signal from the comparator 96 suggests the presence of as many targets as the (UP) input to the counter 102 presumes, the scale factor is zero. The adjustment loop thus varies the background threshold as a function of the suggested target presence signals.

In accordance with the present invention, a plurality of threshold levels are provided which can effect various probabilities of false alarm, one yielding a high probability of false alarm and another a low probability of false alarm when desired. Two probabilities of false alarm shown as elements 104 and 106, respectively, can be multiplexed or separately switched by an element 108 which provides input to a summer 110 having as its other input the scale factor output from counter 102. The output of summer 110 corresponds to a scaled high or low probability of false alarm, the output summer 110 itself serving as a logarithmic scaling factor which can be summed in element 112 with the mean level estimate from log PROM 92. The output from summer 112 enters a comparator 114 as a threshold level together with the logarithmic representation of the 8-bit target value from log PROM 90. If the target value exceeds the output of summer 112, a target is declared. Similarly, when the output of comparator 96 indicates that the logarithm of the target value from log PROM 90 exceeds the scaled mean from summer 94, a target declaration is also indicated. Finally, another threshold level is delivered which is dependent upon range. Derived from the radar trigger, a range counter 116 provides a digital range output to a log PROM 118 which is then scaled by element 120 and entered into a summer 122. Another selected constant $K_d$ is entered into summer 122, the output of summer 122 thus corresponding to a threshold level which depends on range. The logarithmic target value from log PROM 90 is compared to this threshold level in logarithmic form in comparator 124. The output from the comparator 124 is then ANDed in gate 126 with the output of the comparator 114 to determine a third dual-condition target declaration. The outputs from comparator 96 and 114, and gate 126 enter a threshold select multiplexer 128 (having manual and computer inputs) which is used to select one of the three target declaration outputs corresponding to a given radar environment. The output from multiplexer 128 is checked by a wide pulse inhibit element 130 which determines if a target declaration has been detected through too many range cells, suggesting an erroneous target detection or declaration. Once a target declaration is indicated by the output of the wide pulse inhibit 130, batch/batch correlation takes place in a correlator 131 which can be switched on or off as desired by computer-controlled switch 132. In a memory element 133 the current output from the wide pulse inhibit element 130 is compared with the wide-pulse inhibit output which occurred 16 sweeps earlier. In accordance with the present embodiment, correlation between two successive batches of sweeps is effected. Correlation between three or more batches could also be effected by increasing memory storage and comparing present data returns with those of not only sixteen but also thirty-two, forty-eight, or 16n sweeps previously stored. The actual correlation is performed in an AND gate 134. Output from gate 134 indicates that, after azimuth integration, a target was declared through mean level detection and batch/batch correlation.

As seen in FIG. 1, the radar video converter is also provided with a computer interface module 200 which takes output from the adaptive video processor 3 and prepares it for use in a computer (not shown). With a command from the computer via I/O buffer 202, a selection of thresholds is made. An RPC (radar processing control) gate and target gate stored in element 204 and a CSC (combat system control) gate control provide threshold inputs to threshold select multiplexer 128.

The computer interface module 200 controls all input/output communications between the computer and the radar video converter. Data from the computer identifies a gate and a function to be performed relative to those gates. For example, a "clear" function disables the RPC and target gates and clears the control lines to the computer; a "receive RPC and target gate" function alerts the radar video converter that a specified number of gates are to be outputted. Other computer interface functions such as "enable" and "interface testing" are also provided.

Data going to the computer comes, in part, from a word formation element 206 via I/O buffer 202. Timing and control inputs to the word formation element 206 come from the synchronizing clock 74. Detection signal inputs enter the word formation element 206 from the mean level detector 76 and the batch/batch correlator 132. Target azimuth information from a radar bearing measurement apparatus (not shown) is converted to digital form in an angle A/D converter 208 before being fed into the word formation element 206. Target amplitude and background or mean level amplitude inputs to the word formation element 206 come from the mean level detector 76 of the adaptive video processor 3. The word formation element 206 comprises a multiplexer 210 and a first-in, first-out (FIFO) memory element 212. Words relating to the various inputs are generated sequentially and are provided to the computer for storage and processing.

Various other modifications, adaptations and alterations are, of course, possible in light of the above teachings. Therefore, it should be understood that within the scope of the appended claims the invention may be practiced otherwise than as specifically described.

We claim:

1. A radar video converter for interfacing a two-dimension sweeping radar and a digital computer, comprising:

an adaptive video processor which comprises:

an azimuth integration stage, having video returns in digital form as inputs, for summing the video returns at each of a plurality of azimuths, the sum for each azimuth being taken over a plurality of ranges, and for providing an output corresponding to the sum of video returns at each respective azimuth, a mean level detector stage for receiving the output from the azimuth integration stage and for suggesting the presence of a target at a given azimuth when a target cell signal corresponding to the video return at the given azimuth at a given time exceeds a background threshold derived from signals at neighboring azimuths combined in a predetermined fashion, a batch/batch correlation stage for determining target detection correlation between successive sums of video returns summed at a given range on subsequent sweeps, means for providing a plurality of fixed threshold levels, means for separately comparing the fixed threshold levels with the target cell signal of the mean level detector stage, and threshold selection multiplexer means for selecting the mean level detector output or one of the fixed threshold comparing means outputs for use in determining a target detection output.

2. A radar video converter, as in claim 1, wherein the mean level detector provides a target cell signal corresponding to the video return at a given azimuth and a mean level estimate corresponding to the mean signal level at neighboring background azimuths and wherein the mean level detector further comprises:
a closed-loop circuit comprising means for scaling the mean level estimate in accordance with a first preset probability of false alarm, thereby producing a background threshold, and first comparator means for comparing the background threshold with target cell signals to suggest the presence of a target.

3. A radar video converter, as in claim 2, wherein the closed-loop circuit further comprises:
an up-down counter which is incremented by pulses entered at a constant repetition rate based on the first preset probability of false alarm and decremented by the first comparator means output, and a divider for dividing the first comparator means output by a constant value which is a function of first preset probability of false alarm, the number of bits in the up-down counter, and the up count pulse repetition rate of the up-down counter,
wherein the output of the divider enters the up-down counter as a decrementing input, and wherein the output of the up-down counter represents a digital scaling factor.

4. A radar video converter, as in claim 3, further comprising:
the closed-loop circuit wherein the output of the first comparator means in said closed loop circuit suggests the presence of a target based on one radar environment,
means for generating a supplementary scaling factor as a function of range and for scaling a constant signal by the supplementary scaling factor in order to provide a second threshold, and
second comparator means for comparing the target cell signal with the second threshold in order to suggest the presence of a target in a second radar environment.

5. A radar video converter, as in claim 4, wherein the means for providing a plurality of threshold levels comprises:
means for selectively providing one of a plurality of fixed probability of false alarm signals,
means for varying the scale factor generated in the closed-loop circuit by the selected probability of false alarm signal, and
means for applying the output of the scale factor varying means to the mean level estimate,
thereby providing one of the plurality of threshold levels.

6. A radar video converter, as in claim 5, further comprising:
a computer interface module for providing threshold selection inputs from the digital computer to the adaptive video processor to indicate how thresholds must be exceeded before a target is declared and for transferring the azimuth of target detection and the selected threshold from the adaptive video processor to the digital computer.

7. A radar video converter, as in claim 1, wherein a plurality of modes of digitized radar video enter the azimuth integration stage simultaneously and in parallel and wherein the azimuth integration stage comprises:
a plurality of parallel integrator elements, each integrator element comprising:
a summing element having digitized radar video in one mode as an input, and
a shift register element, connected to the summing element for storing the current output of the summing element, the output from the shift register element being fed back as an input to the connected summing element, and
means connected to the plurality of integrator elements for multiplexing the parallel outputs of the integrator elements sequentially and periodically, the output from the multiplexing means resulting in a single serial signal of summed outputs taken from the shift register elements of the corresponding integrator elements in sequence and being entered into the mean level detector stage.

8. A radar video converter, as in claim 7, further comprising:
timing control means for dumping the contents of each integrator element after its corresponding memory element output is switched through the multiplexing means to become part of the serial signal.

* * * * *